US008955209B2

(12) United States Patent
Dyer et al.

(10) Patent No.: US 8,955,209 B2
(45) Date of Patent: Feb. 17, 2015

(54) METHOD OF JOINING TWO COMPONENTS TO ENSURE AXIAL AND ANGULAR ALIGNMENT THEREBETWEEN

(71) Applicant: Diamond Innovations, Inc., Worthington, OH (US)

(72) Inventors: Dwight E. Dyer, Kingston, OH (US); Ray Phillip Conley, Johnstown, OH (US)

(73) Assignee: Diamond Innovations, Inc., Worthington, OH (US)

( * ) Notice: Subject to any disclaimer, the term of this patent is extended or adjusted under 35 U.S.C. 154(b) by 184 days.

(21) Appl. No.: 13/658,891

(22) Filed: Oct. 24, 2012

(65) Prior Publication Data

US 2013/0101362 A1    Apr. 25, 2013

Related U.S. Application Data

(60) Provisional application No. 61/550,560, filed on Oct. 24, 2011.

(51) Int. Cl.
*B21K 5/04* (2006.01)
*B21K 5/12* (2006.01)
(Continued)

(52) U.S. Cl.
CPC .................. *B23K 1/0008* (2013.01); *B23K 3/08* (2013.01); *B23K 31/025* (2013.01); *B23P 15/32* (2013.01); *B23P 15/34* (2013.01); *B23K 2201/20* (2013.01);
(Continued)

(58) Field of Classification Search
CPC .... B23B 27/20; B23B 222/28; B23C 5/1018; B23C 5/1081; B23K 20/129; E21B 10/36; E21B 10/62
USPC .............. 29/464, 466, 467, 468; 51/295, 307, 51/309; 76/108.1, 108.2, 108.4, 108.6; 156/60; 175/420.1, 420.2; 228/101, 228/113, 114, 119, 256
See application file for complete search history.

(56) References Cited

U.S. PATENT DOCUMENTS

| 3,451,791 A | 6/1969 | Meadows |
| 3,936,767 A | 2/1976 | Besson et al. |

(Continued)

FOREIGN PATENT DOCUMENTS

| EP | 312487 B1 | 9/1993 |
| EP | 1624988 B9 | 3/2009 |

(Continued)

*Primary Examiner* — Alexander P Taousakis

(57) ABSTRACT

A method for bonding together components, such as a tip and a shaft which include mutually facing carbide end surfaces. The tip includes circumferentially spaced flutes formed in its cylindrical outer periphery. The shaft has a cylindrical outer periphery and a plurality of coolant holes extending through the shaft. Bonding of the tip to the shaft is performed by inserting gauge wires into the coolant holes and associated flutes, and positioning brazing material between the first and second end surfaces. A water-soluble bond-blocking material is applied to the gauge wires for preventing brazing of the gauge wires to the brazing material. The brazing material is heated to braze the first and second end surfaces together while the flutes and their associated coolant holes are maintained in alignment by the gauge wires. Then, the gauge wires are removed, and residual bond-blocking material is dissolved in water.

26 Claims, 3 Drawing Sheets

(51) Int. Cl.
  *B23K 1/00* (2006.01)
  *B23K 3/08* (2006.01)
  *B23K 31/02* (2006.01)
  *B23P 15/32* (2006.01)
  *B23P 15/34* (2006.01)

(52) U.S. Cl.
  CPC ......... *B23B 2240/08* (2013.01); *B23C 2210/03* (2013.01); *B23C 2240/08* (2013.01)
  USPC .................. 29/464; 29/466; 29/467; 51/307; 51/309; 76/108.1; 76/108.2; 76/108.4; 76/108.6

(56) References Cited

U.S. PATENT DOCUMENTS

| | | | |
|---|---|---|---|
| 4,350,215 A | | 9/1982 | Radtke |
| 4,356,873 A | * | 11/1982 | Dziak ........................ 175/420.1 |
| 4,527,998 A | * | 7/1985 | Knemeyer ..................... 51/309 |
| 4,694,919 A | | 9/1987 | Barr |
| 4,704,055 A | | 11/1987 | Guhring |
| 4,884,477 A | | 12/1989 | Smith et al. |
| 4,950,557 A | | 8/1990 | Nakai |
| 5,273,379 A | * | 12/1993 | Nishimura ................... 408/144 |
| 5,669,271 A | | 9/1997 | Fuller |
| 6,021,826 A | | 2/2000 | Daniell |
| 6,158,304 A | | 12/2000 | Packer |
| 6,209,420 B1 | | 4/2001 | Butcher |
| 6,868,848 B2 | | 3/2005 | Boland |
| 7,384,223 B2 | | 6/2008 | Nadler |
| 7,585,342 B2 | | 9/2009 | Cho |
| 2003/0054745 A1 | | 3/2003 | Bergquist |
| 2003/0140678 A1 | | 7/2003 | Siegel et al. |
| 2005/0133277 A1 | | 6/2005 | Dixon |
| 2007/0035003 A1 | | 2/2007 | Garth |
| 2008/0017421 A1 | | 1/2008 | Lockwood |
| 2008/0028891 A1 | | 2/2008 | Calnan |
| 2008/0128176 A1 | | 6/2008 | Choe |
| 2008/0150114 A1 | | 6/2008 | Mohammed et al. |
| 2008/0282618 A1 | | 11/2008 | Lockwood |
| 2009/0283335 A1 | | 11/2009 | Fulenchek |
| 2010/0008738 A1 | | 1/2010 | Drivdahl |
| 2010/0181117 A1 | * | 7/2010 | Scott ............................ 175/428 |
| 2011/0036641 A1 | * | 2/2011 | Lyons .......................... 175/432 |
| 2011/0036643 A1 | * | 2/2011 | Belnap et al. ................. 175/434 |
| 2013/0015341 A1 | * | 1/2013 | Steiner et al. ................. 250/281 |
| 2013/0263519 A1 | * | 10/2013 | Lin et al. ........................ 51/295 |
| 2014/0237906 A1 | * | 8/2014 | Alkhalaileh et al. ........... 51/307 |

FOREIGN PATENT DOCUMENTS

| | | |
|---|---|---|
| WO | 9635537 A1 | 11/1996 |
| WO | 2009152194 A2 | 12/2009 |
| WO | 2010005891 A2 | 1/2010 |

* cited by examiner

METHOD OF JOINING TWO COMPONENTS TO ENSURE AXIAL AND ANGULAR ALIGNMENT THEREBETWEEN

CROSS-REFERENCE TO RELATED APPLICATION

This application claims the benefit of the U.S. Provisional Application No. 61/550,560, filed Oct. 24, 2011.

TECHNICAL FIELD AND INDUSTRIAL APPLICABILITY

The present invention concerns the joining together of components which are to be properly axially and angularly aligned, more specifically, a method for bonding a metal cutting tip to a shaft.

BACKGROUND

It is known to form certain products by bonding together components of the product. In certain cases, the bonded components are to be precisely aligned. For example, certain metal cutting bits comprise a fluted front end section and a rear shaft section having coolant holes extending therethrough for conducting high-pressure cooling fluid to rear ends of the flutes, or grooves, to cool the bit and flush the cuttings. The tip and the shaft are to be axially aligned so their respective cylindrical outer peripheries are mutually aligned. The tip and the shaft are also to be angularly aligned so the coolant holes of the shaft are aligned with the respective flutes of the tip. If the flutes and coolant holes were misaligned, the high-pressure cooling fluid could be misdirected in such manner as to cause the tool to be diverted from its intended direction of travel.

It would be desirable, therefore, to provide a method of bonding together components requiring precise alignment, such as metal cutting tools, end mills and drill bits.

SUMMARY OF THE DISCLOSURE

Disclosed is a method for bonding a first component to a second component, wherein the first component includes first openings intersecting a first end surface of the first component, and the second component includes second openings intersecting a second end surface of the second component. The method comprises the steps of:

A. positioning elongated elements, wherein each elongated element extends into a first opening and an associated second opening to align the first openings with the associated second openings;

B. bonding the first and second components together while the first openings are maintained in alignment with the associated second openings by the elongated elements; and C. removing the elongated elements subsequent to step B.

Also disclosed is a method for bonding a metal cutting tip to a shaft, wherein the tip includes first openings intersecting a first end surface of the tip, and the shaft includes second openings intersecting a second end surface of the shaft. The method comprises the steps of:

A. positioning elongated elements, wherein each elongated element extends into a first opening and an associated second opening to align the first openings with the associated second openings, with brazing material disposed between the first and second end surfaces;

B. applying to each elongated element a bond-blocking material for preventing brazing of the elongated elements to the brazing material;

C. applying heat to the brazing material to braze the first and second end surfaces together while the first openings are maintained in alignment with the associated second openings by the elongated elements; and D. removing the elongated elements and residual bond-blocking material subsequent to step C.

Further disclosed is a method for bonding a tip to a shaft, wherein the tip and the shaft include mutually facing carbide end surfaces. The tip includes a first cylindrical outer periphery and circumferentially spaced flutes formed therein. Each flute is of substantially U-shaped cross section with a radiused bottom. The shaft has a second cylindrical outer periphery and plurality of coolant holes extending through the shaft. The radii of the first and second outer peripheries are substantially equal. Each coolant hole has a radius substantially equal to a radius of its respective flute bottom. The method comprises the steps of:

A. providing gauge wires each having a radius substantially equal to the radii of the flute bottoms and the coolant holes;

B. inserting each gauge wire into a respective coolant hole and a respective flute bottom, to align each flute bottom with the associated coolant hole, and to align the first cylindrical periphery with the second cylindrical periphery;

C. positioning brazing material between the first and second end surfaces;

D. applying to an exposed portion of each gauge wire a bond-blocking material for preventing brazing of the gauge wires to the brazing material;

E. applying heat to the brazing material to braze the first and second end surfaces together while the flute bottoms are maintained in alignment with the associated coolant holes by the gauge wires; and F. removing the gauge wires, and dissolving residual bond-blocking material in a solvent, subsequent to step E.

Further objects and advantages will become obvious to a person skilled in the art when reading the detailed description below of the embodiment.

BRIEF DESCRIPTION OF THE DRAWINGS

An embodiment will be described further below with reference to the enclosed drawings.

DETAILED DESCRIPTION

Figure 1:
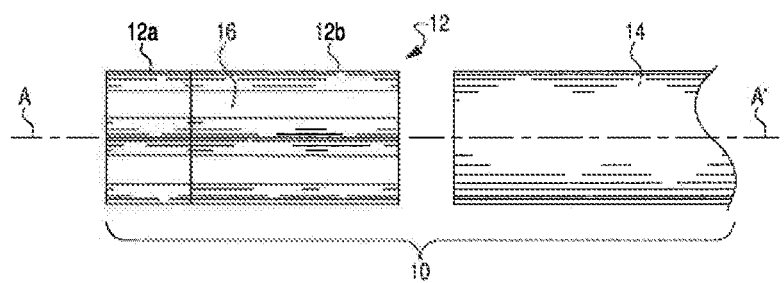
FIG. 1 is an exploded side elevational view of a tip and a shaft.

Depicted in FIG. 1 is an embodiment having a first component of a metal-cutting bit 10, namely a tip 12 and a second component of shaft 14. In an embodiment, the tip 12 comprises a front section 12a that may be formed of PCD (polycrystalline diamond) or pCBN (polycrystalline cubic boron nitride) bonded to a rear section 12b formed of carbide. Other materials that may form the front section 12a include superabrasive composite materials such as diamond composite materials or other composite materials containing superabrasive materials having a Knoop hardness of 3000 kg/mm$^2$.

In an embodiment, the shaft 12 is formed of carbide and is to be bonded to the carbide section 12b of the tip 12. In addition to carbides, other materials that may form the rear section 12b and the shaft 12 include cermets and cermets containing one or more materials selected from carbides, nitrides and carbonitrides of metals selected from among Group 4, Group 5, and Group 6 of the periodic table.

Figure 2:
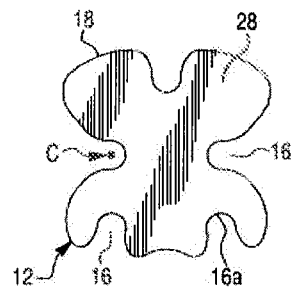
FIG. 2 is an end view of the tip.

Formed in an outer periphery 18 of the tip are first openings in the form of circumferentially spaced flutes, channels or grooves 16 which extend axially (i.e., parallel to the center axis of the tip) for the full length of the tip. Outer periphery 18 may be any shape depending on the application of the tool. Six flutes are shown in FIG. 2, but the number could vary. The flutes function to receive cuttings and conduct coolant fluid which cools the tool and flushes cuttings during operation.

Figure 3:
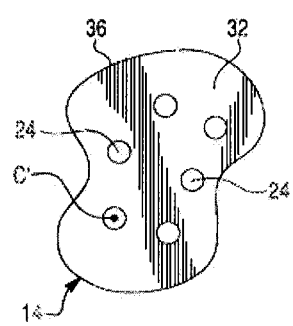
FIG. 3 is an end view of the shaft.

The coolant fluid is to be supplied to rear ends of the flutes from second openings in the form of coolant holes 24 (six holes are shown in FIG. 3 as an example) that extend axially completely through the cylindrical shaft 14 and which are to be connected to a source of pressurized coolant fluid during a reaming operation. The coolant holes 24, depicted as circular holes in the Figures, may be any shape or combination of shapes. The holes 24 may be spaced equidistantly around the center axis of the shaft and have respective front outlet ends disposed in a front surface 32 of the shaft. The number of coolant holes 24 may correspond to the number of flutes, since the holes 24 function to deliver coolant fluid to respective flutes 16.

As shown in FIG. 2, each flute 16 may be U-shaped in cross section with a radiused bottom 16a. The flute may be any shape so long as each flute bottom 16a may be aligned with a respective coolant hole. The radius of each flute bottom 16a may be equal to the radius of its respective coolant hole 24, and, in the finished bit, the center C of the radiused bottom may be aligned with the center C' of the respective coolant hole.

The tip 12 may be bonded to the shaft 14 by brazing the tip's rear surface 28 to the shaft's front surface 32. Any technique or method known in the art may be used for affixing the tip to the shaft, including brazing techniques, infiltration techniques, press fitting techniques, shrink fitting techniques, and welding techniques, for example. It will be appreciated that the tip 12 may be bonded to the shaft 14 such that the center axis A of the tip is aligned with the center axis A' of the shaft so that the cylindrical outer periphery 18 of the tip is aligned with the cylindrical outer periphery 36 of the shaft 14. Also, the tip 12 may be angularly aligned with the shaft 14 so that the radiused bottoms 16a of the flutes have their centers C aligned with the centers C' of respective coolant holes 24, as explained above.

Figure 4:
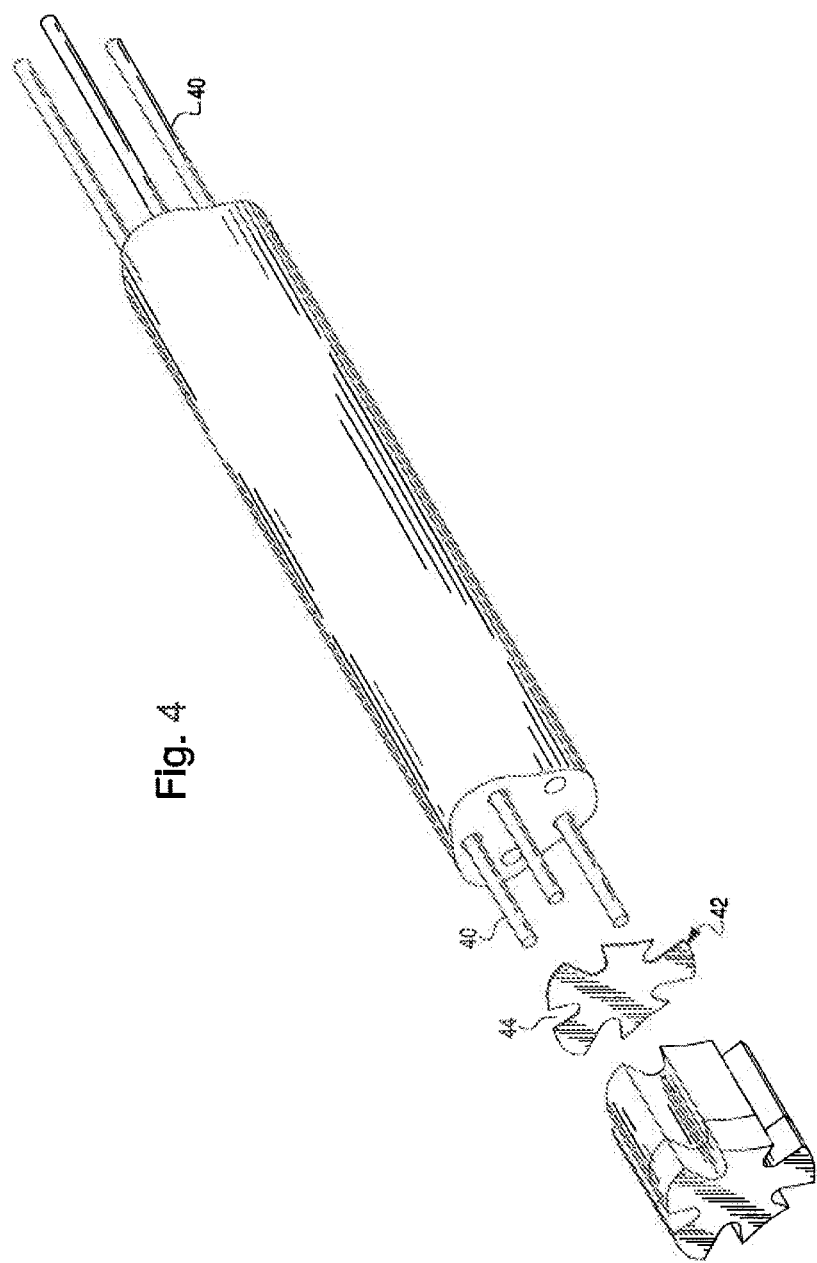
FIG. 4 is an exploded perspective of the tip and shaft after gauge wires have been inserted through coolant holes of the shaft, and a brazing foil positioned between the tip and the shaft.

Such axial and angular alignment may be established by a method involving the insertion of elongated elements 40 through the coolant holes 24 such that the ends of the elongated elements project from the front surface 32 of the shaft. For the sake of clarity, only three of the six elongated elements are shown in FIG. 4. In an embodiment, each elongated element 40 comprises a gauge wire having a diameter substantially equal to the common diameter of the coolant holes 24, although other suitable types of elongated elements could be used. Elongated elements may be fabricated from plastics, metals, metals alloys, paper products, fiber reinforced composite materials and combinations thereof, for example. The elongated elements may be wire-shaped or flat pieces of material.

If brazing is used, prior to brazing the tip 12 to the shaft 14, the exposed ends of the gauge wires 40 may be coated with a bond-blocking material suitable for preventing the gauge wires from bonding to the brazing material. A suitable bond-blocking material may be a water-soluble ceramic fluid sold commercially by Lucas-Milhaupt, Inc. under the name Stop-Off. After being coated, the coated portions of the gauge wires are pulled partially back into the shaft so that some of the Stop-Off material enters the respective coolant holes 24 to block entry of brazing material into the holes during the brazing step.

Figure 5:
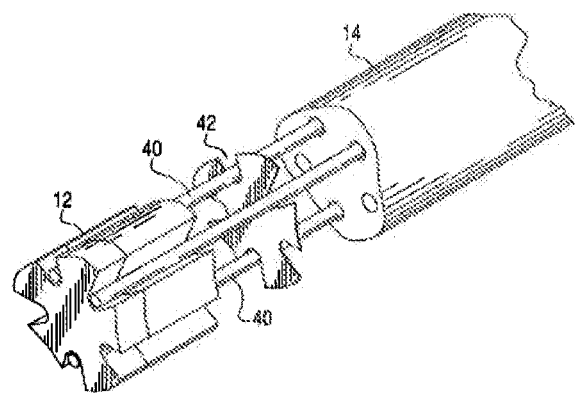
FIG. 5 is a perspective view after the gauge wires have been inserted through the brazing foil and into flutes of the tip.

The tip's rear surface 28 and the shaft's front surface 32 may be then positioned opposite one another, and the exposed ends of the gauge wires 40 are inserted into the radiused bottoms 16a of the flutes 16, as shown in FIG. 5. This ensures that the tip and the shaft may be axially and angularly aligned and also causes Stop-Off material to enter the flutes to block the entry of brazing material into the flutes.

Placed between the surfaces 28 and 32 is the brazing material, i.e., a filler metal such as a braze foil 42 having suitable holes or recesses 44 formed therein to accommodate passage of the gauge wires.

While the tip 12 and the shaft 14 are held in axial and angular alignment by the gauge wires, heat is applied in any suitable way to the braze foil 42, e.g., by inductive heating, to cause the braze foil to melt and adhere to the tip surface 28 and the shaft surface 32. The brazing material does not adhere to the gauge wires and does not enter and adhere to the walls of the coolant holes 24 or flutes 16, due to the presence of the Stop-Off material.

Figure 6:
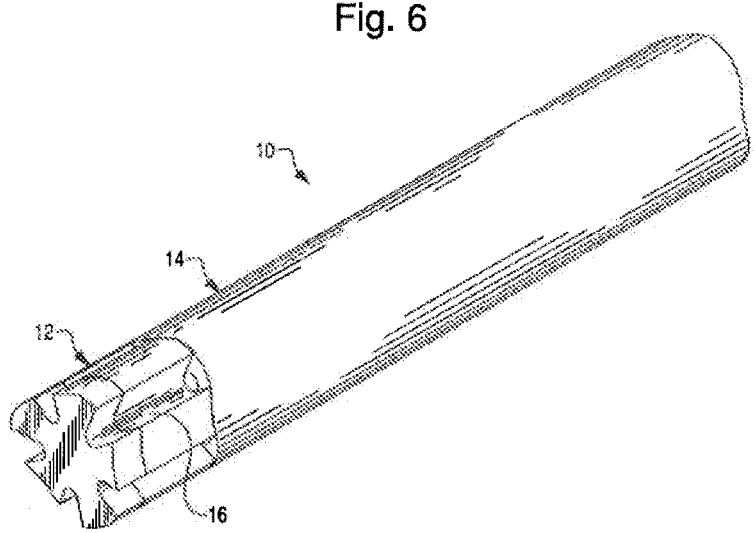
FIG. 6 is a view similar to FIG. 5 after the tip has been brazed to the shaft and the gauge wires have been removed.

Once the tip and the shaft have been brazed together to form the bit 10, the elongated elements 40 are removed. Also, residual water-soluble Stop-Off material on the bit may be dissolved by placing the bit in hot water which is subjected to sonic energy. The finished bit 10 is shown in FIG. 6.

It will be appreciated that although PCD, pCBN and carbides are disclosed as the first and second components. The first and second components may be fabricated from plastics, glass, ceramics, carbon fiber and glass fiber composites and combinations thereof.

It will also be appreciated that the bonding method disclosed herein is not limited to metal-cutting tools, but is applicable to the bonding together of any components having openings such a holes, flutes or the like in both components and which require precise axial and angular alignment. Although brazing is required for the bonding of the disclosed components, due to the strong angular forces to which a bit is subjected, other types of bonding, such as soldering, gluing, welding, etc. could be employed for the bonding of components of a product that is not to be subjected to similar forces.

It will also be appreciated that other additions, deletions, modifications and substitutions not specifically described may be made without departing from the spirit and scope of the invention defined in the appended claims.

What is claimed is:

1. A method for bonding a first component to a second component, wherein the first component includes first openings intersecting a first end surface of the first component, and the second component includes second openings intersecting a second end surface of the second component, the method comprising the steps of:

A. positioning a plurality of elongated elements, wherein each elongated element extends into a first opening and a respective second opening to align the first openings with respective second openings;

B. bonding the first and second components together while the first openings are maintained in alignment with the respective second openings by the elongated elements; and C. removing the elongated elements subsequent to step B, wherein the first component is a cutting tip and the second component is a shaft.

2. The method as claimed in claim 1, further comprising the step of positioning filler metal between the first and second end surfaces, and step B comprises applying heat to the filler metal.

3. The method as claimed in claim 2, wherein step A comprises extending the elongated elements through respective recesses in the filler metal.

4. The method as claimed in claim 2, further comprising the step of applying, to each elongated element, a bond-blocking material for preventing bonding of the elongated elements to the filler metal.

5. The method as claimed in claim 1, wherein the first and second components have first and second cylindrical outer peripheries, respectively, wherein step A causes the first and second outer peripheries to be aligned with one another.

6. The method as claimed in claim 1, wherein each elongated element is gauge wire.

7. The method as claimed in claim 1, wherein each elongated element is formed of materials selected from metals, metals alloys, paper products, fiber reinforced composite materials and combinations thereof, wherein the elongated elements are wire-shaped or flat pieces of material.

8. The method as claimed in claim 1, wherein the filler metal comprises a braze foil, and step B comprises brazing the first and second end surfaces together.

9. The method as claimed in claim 1, wherein each of the first openings comprises a flute formed in the first outer periphery, and each of the second openings comprises a through-hole extending axially through the second component, each flute having a radiused bottom with a radius equal to a radius of a respective through-hole, and wherein step A causes a center of each radiused bottom to be aligned with a center of the respective through-hole.

10. The method as claimed in claim 1, further comprising, between steps A and B, the step of moving the elongated elements axially relative to the first and second components, to cause the bond-blocking material to enter each of the first and second openings.

11. The method as claimed in claim 1, wherein the first and second components are fabricated from a material selected from the group of plastics, glass, ceramics, carbon fiber and glass fiber composites and combinations thereof.

12. The method as claimed in claim 1, wherein said bonding step is performed using a method selected from the group of gluing, welding, brazing techniques, infiltration techniques, press fitting techniques, shrink fitting techniques, welding techniques and combinations thereof.

13. The method as claimed in claim 1, wherein said first and second openings are holes of any shape.

14. A method for bonding a metal cutting tip to a shaft, wherein the tip includes first openings intersecting a first end surface of the tip, and the shaft includes second openings intersecting a second end surface of the shaft, the method comprising the steps of:

A. positioning elongated elements, wherein each elongated element extends into a first opening and an associated second opening to align the first openings with the associated second openings, with brazing material disposed between the first and second end surfaces;

B. applying to each elongated element a bond-blocking material for preventing brazing of the elongated elements to the brazing material;

C. applying heat to the brazing material to braze the first and second end surfaces together while the first openings are maintained in alignment with the associated second openings by the elongated elements; and D. removing the elongated elements and residual bond-blocking material subsequent to step C.

15. The method as claimed in claim 14, wherein the brazing material comprises a braze foil, and step A comprises extending the elongated elements through respective recesses in the braze foil.

16. The method as claimed in claim 14, wherein the tip and the shaft have first and second cylindrical outer peripheries, respectively, wherein step A causes the first and second outer peripheries to be aligned with one another.

17. The method as claimed in claim 14, wherein each elongated element comprises a gauge wire.

18. The method as claimed in claim 14, wherein step D comprises dissolving residual bond-blocking material in a solvent.

19. The method as claimed in claim 14, wherein first openings comprise flutes formed in an outer periphery of the tip, and the second openings comprise through-holes extending axially through the shaft, each flute having a radiused bottom with a radius equal to a radius of the through-holes, and wherein a center of each radiused bottom is aligned with a center of a respective through-hole.

20. The method as claimed in claim 14, wherein the first and second end surfaces comprise carbide.

21. The method as claimed in claim 14, further comprising, between steps B and C, the step of moving the elongated elements axially relative to the tip and the shaft to cause the bond-blocking material to enter the first and second openings.

22. A method for bonding a tip to a shaft, wherein the tip and the shaft include mutually facing carbide end surfaces, the tip including a first cylindrical outer periphery and circumferentially spaced flutes formed therein, each flute being of substantially U-shaped cross section with a radiused bottom, the shaft including a second cylindrical outer periphery with a radius substantially equal to a radius of the tip, and plurality of coolant holes extending through the shaft, each coolant hole having a radius substantially equal to a radius of an associated flute bottom, the method comprising:

A. providing gauge wires each having a radius substantially equal to the radii of the flute bottoms and the coolant holes;

B. inserting each gauge wire into a respective coolant hole and its associated flute bottom, to align each flute bottom with the associated coolant hole, and to align the first cylindrical periphery with the second cylindrical periphery;

C. positioning brazing material between the first and second end surfaces;

D. applying to an exposed portion of each gauge wire a bond-blocking material for preventing brazing of the gauge wires to the brazing material;

E. applying heat to the brazing material to braze the first and second end surfaces together while the flute bottoms are maintained in alignment with the respective coolant holes by the gauge wires; and F. removing the gauge wires, and dissolving residual bond-blocking material in a solvent, subsequent to step E.

23. The method as claimed in claim 22, further comprising, between steps D and E, the step of moving the gauge wires axially relative to the tip and the shaft to cause bond-blocking material on the exposed portions of the gauge wires to enter the flute bottoms and the coolant holes.

24. The method as claimed in claim 22, wherein step C is performed prior to step D, with the brazing material comprising a braze foil having recesses accommodating passage of respective gauge wires.

25. A method for bonding a first component to a second component, wherein the first component includes first openings intersecting a first end surface of the first component, and the second component includes second openings intersecting a second end surface of the second component, the method comprising the steps of:
   A. step for positioning a plurality of elongated elements, wherein each elongated element extends into a first opening and a respective second opening to align the first openings with respective second openings;
   B. step for bonding the first and second components together while the first openings are maintained in alignment with the respective second openings by the elongated elements; and
   C. step for removing the elongated elements subsequent to step B.

26. A cutting tool made by the method of claim 24.

* * * * *